United States Patent [19]

Hirose et al.

[11] Patent Number: 4,965,311

[45] Date of Patent: Oct. 23, 1990

[54] CURING COMPOSITION HAVING ENHANCING EFFECT ON DRYING CHARACTERISTICS OF ALKYD COATING

[75] Inventors: Toshifumi Hirose; Sadao Yukimoto; Katsuhiko Isayama, all of Hyogo, Japan

[73] Assignee: Kanegafuchi Kagaku Kogyo Kabushiki Kaisha, Osaka, Japan

[21] Appl. No.: 305,137

[22] Filed: Feb. 2, 1989

[30] Foreign Application Priority Data

Feb. 3, 1988 [JP] Japan ................................. 63-23055

[51] Int. Cl.$^5$ ................................................. C08K 5/01
[52] U.S. Cl. ...................................... 524/483; 524/306; 524/313; 524/284; 524/322; 524/366; 524/588; 525/100; 525/105; 525/106; 525/403; 525/408; 525/440; 525/446; 525/460
[58] Field of Search ............... 524/306, 313, 284, 322, 524/366, 588, 483; 525/468, 403, 446, 100, 106, 105, 440, 460

[56] References Cited

U.S. PATENT DOCUMENTS

| | | | |
|---|---|---|---|
| 3,971,751 | 7/1976 | Isayama et al. | 524/783 |
| 4,323,488 | 4/1982 | Takago et al. | 524/863 |
| 4,618,656 | 10/1986 | Kawakubo et al. | 525/403 |

FOREIGN PATENT DOCUMENTS

| | | |
|---|---|---|
| 108946 | 5/1984 | European Pat. Off. . |
| 242903 | 10/1987 | European Pat. Off. . |

OTHER PUBLICATIONS

Patent Abstracts of Japan, vol. 8, No. 110 (C-224) [1547], May 23, 1984.

*Primary Examiner*—Melvyn I. Marquis
*Attorney, Agent, or Firm*—Armstrong, Nikaido, Marmelstein, Kubovcik and Murray

[57] ABSTRACT

A curing composition showing improved drying characteristics of an alkyd coating which comprises:
(A) an oxyalkylene polymer having at least one silicon atom-containing group which has a hydroxyl group or a hydrolyzable group bound to a silicon atom and is capable of crosslinking by forming a siloxane bond;
(B) a polymeric plasticizer and/or a viscous plasticizer; and
(C) an air curing compound.

8 Claims, No Drawings

CURING COMPOSITION HAVING ENHANCING EFFECT ON DRYING CHARACTERISTICS OF ALKYD COATING

BACKGROUND OF THE INVENTION

1. Field of the Invention

This invention relates to a curing composition which comprises an oxyalkylene polymer having a silicon atom-containing group which has a hydroxyl group or a hydrolyzable group bound to a silicon atom and is capable of crosslinking by forming a siloxane bond. The silicon-atom containing group will be simply called a reactive silicon group hereinafter.

2. Prior Art

An oxyalkylene polymer having a reactive silicon group is curable at room temperature to thereby give a rubber-like material, similar to a room temperature curing silicone rubber. The cured material thus obtained is excellent in tensile properties and adhesiveness and thus is widely available in, for example, sealants and adhesives.

One of the characteristics of an oxyalkylene polymer having a reactive silicon group is that almost every common coating can be applied onto the surface of the material obtained by curing said oxyalkylene polymer. In contrast thereto, no coating can be applied onto the surface of a silicone rubber in practice, since said surface is water- and oil-repellant.

However it is observed that an alkyd coating film formed on the surface of a cured material of a composition comprising an oxyalkylene polymer having a reactive silicon group shows sometimes poor drying characteristics, which can make it impractical to apply said coating onto said cured material.

It was not known why the alkyd coating shows such poor drying characteristics. As the result of our extensive studies, we have found that a plasticizer, in particular, one having a low viscosity and a low molecular weight contained in a curing composition comprising an oxyalkylene polymer having a reactive silicon group deteriorates the drying characteristics of an alkyd coating.

A plasticizer is employed in order to lower the viscosity of the composition to thereby improve its workability or to improve the tensile properties of the cured material.

We have attempted to determine a plasticizer which would not deteriorate the drying characteristics of an alkyd coating. As a result, we have found that the above problem can be solved by using a so-called polymeric plasticizer. We have already filed U.S. patent applications (Ser. Nos. 07/288,177 and 07/290,331 entitled "Method of Applying Alkyd Paints to Oxyalkylene Polymers Having a Reactive Silicone Group" and "Curing Composition of Oxyalkylene Polymer", filed on Dec. 26, 1987 and Dec. 28, 1987, respectively) directed to this discovery.

We have attempted to further improve the drying characteristics of an alkyd coating and consequently found that the drying characteristics of an alkyd coating can be . further improved by using a composition which comprises an oxyalkylene polymer having a reactive functional silicon group and a polymeric plasticizer, thus completing the present invention.

SUMMARY OF THE INVENTION

Accordingly, the present invention relates to a curing composition showing improved drying characteristics of an alkyd coating which comprises:

(A) an oxyalkylene polymer having at least one silicon atom-containing group which has a hydroxyl group or a hydrolyzable group bound to a silicon atom and is capable of crosslinking by forming a siloxane bond;

(B) a polymeric plasticizer and/or a viscous plasticizer; and (C) an air curing compound.

DETAILED DESCRIPTION OF THE INVENTION

In the present invention, an oxyalkylene polymer having at least one reactive silicon group, which will be also called an oxyalkylene polymer (A) hereinafter, is used.

The abovementioned oxyalkylene polymer (A) is described, for example, in U.S. Pat. Nos. 3,971,751, and 4,323,488 and JP-B-No. 45-36319, 46-12154, 49-32673, 50-156599, 51-73561, 54-6096, 55-82123, 55-123620, 55-125121, 55-131022, 55-135135 and 55-137129. (The term "JP-B" means an examined Japanese patent publication).

The molecular chain of the oxyalkylene polymer (A) essentially comprises a repeating unit represented by the following general formula:

$$-R^1-O-$$

wherein $R^1$ is an optionally substituted divalent hydrocarbon group having one to eight carbon atoms. It is preferred that $R^1$ is a divalent alkylene group having one to eight, more preferably, two to four, carbon atoms. Some of the hydrogen atoms of this alkylene group may be substituted by substituent(s) such as a chlorine atom.

Preferred examples of $R^1$ include

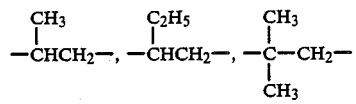

$-CH_2CH_2CH_2CH_2-$. Among these groups,

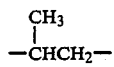

is particularly preferred. The molecular chain of said oxyalkylene polymer (A) may comprise either one or more kinds of said repeating units.

The main chain of the oxyalkylene polymer (A) may comprise a repeating unit of the general formula $-R^1-O-$ optionally together with other repeating unit(s). When it comprises repeating unit(s) other than the one defined above, it preferably comprises 60% (by weight, the same will apply hereinafter) or more, preferably 80% or more, of the repeating $-R^1-O-$ based on the weight of the total polymer.

The reactive silicon group contained in the oxyalkylene polymer (A) is a well known functional group. It can be crosslink even at room temperature. A typical example of the reactive silicon group is the one represented by the following general formula (I):

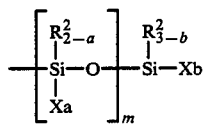  (I)

wherein $R^2$ represents an optionally substituted monovalent organic group having 1 to 20 carbon atoms, provided that two or more $R^2$ groups, if present, may be either the same or different from each other; X represents a hydroxyl group or a hydrolyzable group, provided that two or more X groups, if present, may be either the same or different from each other; a is 0, 1 or 2; b is 0, 1, 2 or 3, provided that (a sum of a and b) $\geq 1$; and m is 0 or an integer of 1 to 19, provided that

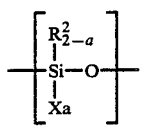

may be either the same or different from each other, when m is 2 or above. Among reactive silicon groups of the general formula (I), those represented by the following general formula (II) are preferred from, for example, an economical viewpoint:

  (II)

wherein $R^2$ is as defined above; and l is 1, 2 or 3.

Examples of the hydrolyzable group represented by X in the general formula (I) or (II) include a halogen atom such as a chlorine atom; a hydrogen atom; an alkoxy group such as a methoxy group or an ethoxy group; an acyloxy group such as an acetoxy group; a ketoxymate group such as a dimethyl ketoxymate group; an amino group such as a dimethylamino group; an amide group such as an N-methylacetamide group; an aminooxy group such as a dimethylaminooxy group; a mercapto group such as a thiophenoxy group; and an alkenyloxy group such as an isopropenyloxy group. Among these hydrolyzable groups, alkoxy groups such as methoxy and ethoxy groups are preferred because of the mild hydrolysis properties thereof.

Examples of the $R^2$ group in the general formula (I) or (II) include optionally substituted hydrocarbon groups having 1 to 20, preferably 1 to 10, carbon atoms such as an alkyl group such as a methyl group, an ethyl group or a chloromethyl group; a cycloalkyl group such as a cyclohexyl group; an aryl group such as a phenyl group, a tolyl group or a chlorophenyl group; an aralkyl group such as a benzyl group; and an alkenyl group such as a vinyl group. Examples of the $R^2$ group further include a triorganosiloxy group represented by the following general formula:

(R')$_3$ SiO— wherein R' represents an optionally substituted monovalent hydrocarbon group, provided that the three R' groups are not always the same as each other; such as a trimethylsiloxy group. Among these groups, a methyl group is particularly preferred as a substituent.

Although the oxyalkylene polymer (A) may have at least one reactive silicon group, it is preferred that said oxyalkylene polymer have at least 1.1, on the average, more preferably 1.5 to 4, reactive silicon groups in order to achieve sufficient curing characteristics. Furthermore, it is preferred that said reactive silicon group(s) is located at the terminal of the molecular chain of the oxyalkylene polymer (A).

The oxyalkylene polymer preferably has a number-average molecular weight of 3,000 to 30,000, more preferably, 5,000 to 15,000. An oxyalkylene polymer (A) may be employed alone. Alternatively, two or more oxyalkylene polymers (A) may be employed together.

The oxyalkylene polymer (A) may be prepared by, for example, subjecting a hydrosilane compound wherein a hydrogen atom is bound to the group represented by the general formula (I) to an addition reaction together with an oxyalkylene polymer having an olefinically unsaturated group represented by the following general formula (III):

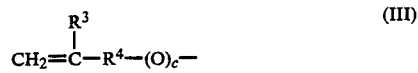  (III)

wherein $R^3$ represents a hydrogen atom or an organic group having 1 to 20 carbon atoms;

$R^4$ represents a divalent organic group having 1 to 20 carbon atoms; and c is 0 or 1; in the presence of a catalyst such as a platinum compound.

Alternatively, the oxyalkylene polymer (A) may be prepared by the following methods.

(1) A polyoxyalkylene group having a terminal hydroxyl group is reacted with a polyisocyanate compound such as toluene diisocyanate to thereby give an alkylene oxide polymer having a terminal isocyanate group which is then reacted with a silicon compound represented by the following general formula (IV):

  (IV)

wherein W represents an active hydrogen-containing group selected from among a hydroxyl group, a carboxyl group, a mercapto group and a primary or secondary amino group; and l, $R^2$, $R^4$ and X are as defined above.

(2) An oxyalkylene polymer having an olefinically unsaturated group represented by the general formula (III) is reacted with a silicon compound represented by the general formula (IV) wherein W is a mercapto group.

(3) An oxyalkylene polymer having a terminal hydroxyl group is reacted with a compound represented by the following general formula:

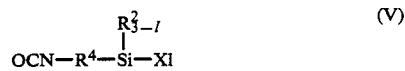  (V)

wherein $R^2$, R4, X and l are as defined above.

However, the process for preparing the oxyalkylene polymer (A) is not restricted thereby.

In the preparation of the oxyalkylene polymer (A), some or all of the X groups may be further converted into other hydrolyzable groups or hydroxyl groups.

When X groups are halogen atoms or hydrogen atoms, for example, they may be preferably converted into, for example, alkoxy groups, acyloxy groups, aminooxy groups, alkenyloxy groups or hydroxyl groups. In the general formula (III), $R^3$ represents a hydrogen atom or an optionally substituted monovalent organic group having 1 to 20 carbon atoms. $R^3$ preferably represents a hydrogen atom or a hydrocarbon group. A hydrogen atom is particularly preferred therefor.

The $R^4$ group as defined above is a divalent organic group. Preferable examples thereof include —$R^5$—,

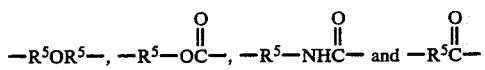

groups wherein $R^5$ represents a divalent hydrocarbon group having 1 to 10 carbon atoms. Particularly preferred examples thereof include methylene, ethylene, propylene and butylene groups.

The oxyalkylene polymer having an olefinically unsaturated group represented by the general formula (III) may be prepared by, for example, a method disclosed in JP-A-No. 54-6097 (the term "JP-A" means an unexamined published Japanese Patent Application) which comprises reacting the terminal hydroxyl group of an oxyalkylene polymer with a compound having an unsaturated group to thereby introduce said unsaturated group into the terminal of the oxyalkylene polymer through the formation of an ether bond, an ester bond, an urethane bond or a carbonate bond. Alternatively, the oxyalkylene polymer (A) may be prepared by copolymerizing an epoxy compound such as ethylene oxide or propylene oxide together with an olefinically unsaturated group-containing epoxy compound such as allyl glycidyl ether to thereby introduce said olefinically unsaturated group into a side chain.

The composition of the present invention comprises a polymeric plasticizer and/or a viscous plasticizer.

The polymeric plasticizer has a molecular weight of 500 to 15,000, preferably 700 to 10,000.

Examples of the polymeric plasticizer include polyesters such as a polymer of a dibasic acid and a dihydric alcohol or a lactone polymer; polyethers such as polypropylene glycol or derivatives thereof; aromatic unsaturated polymers such as poly-α-methylstyrene or polystyrene; polydienes such as polybutadiene, butadiene/acrylonitrile copolymer, polychloroprene or polyisoprene; polybutene; and hydrogenated polybutene, though it is not restricted thereby. Among these materials, polyesters and polyethers are preferred since they can improve the drying characteristics of an alkyd coating, they are highly compatible with the oxyalkylene polymer (A) and they can lower the viscosity of the composition. Polyethers are particularly preferred since they would impart a low modulus and a high elongation to the resulting cured composition.

Among the abovementioned polyethers, those having a number-average molecular weight of at least 4,000, preferably at least 4,500 and more preferably 5,000 to 10,000, are favorable. A polyether having a small number of terminal hydroxyl groups is preferred since it can give improved drying characteristics to an alkyd coating. Those having essentially no terminal hydroxyl groups are more preferred. Examples of these polyethers include those wherein a terminal hydroxyl group is blocked with, for example, an alkyl group, an aryl group or an alkenyl group through an ether bond, an ester bond, an urea bond, an amide bond or a carbonate bond. It is further preferred that the polyether comprises 10% or below, more preferably, 5% or below, (determined by the GPC method, the same will apply hereinafter) of component(s) of a number-average molecular weight of 1,000 or below in order to achieve improved drying characteristics of an alkyd coating. It is preferred that the polyether has a narrow range of molecular weight distribution (i.e., weight-average molecular weight (Mw)/number-average molecular weight (Mn)) in order to achieve improved drying characteristics of an alkyd coating, since the content of low molecular weight component(s) would decrease with a decrease in the above ratio. Namely, the polyether preferably has an Mw/Mn ratio of 2 or below, still preferably 1.5 or below.

Examples of such a polyether as described above include polyoxypropylene glycol having a number-average molecular weight of 4,000 or above and showing a narrow molecular weight distribution or containing a small amount of component(s) having a molecular weight of 1,000 or below whose terminal hydroxyl group, preferably both terminal hydroxyl groups, is optionally blocked with, for example, alkyl ether bond(s), alkyl phenyl ether bond(s), alkenyl ether bond(s) or aryl ether bond(s).

A viscous plasticizer to be used in the present invention means one having a viscosity of 8 poise or above, preferably approximately 20 to 300 poise, at 25° C. Although the molecular weight of the viscous plasticizer is not particularly restricted, most of viscous plasticizers are polymeric since the viscosity of a plasticizer generally increases with an increase in molecular weight.

Examples of a nonpolymeric but viscous plasticizer include triaryldiethane, isomeric mixtures thereof, 1-phenyl-1-xylylethane and chlorinated paraffin, though it is not restricted thereby. Among these compounds, triaryl-diethane and isomeric mixtures thereof are preferred.

Either one of these polymeric plasticizers and/or viscous plasticizers or a mixture thereof may be used in the present invention. The plasticizer may be blended as a solvent during the preparation of the oxyalkylene polymer (A).

The polymeric plasticizer and/or viscous plasticizer is preferably employed in an amount of 1 to 150 parts (by weight, the same will apply hereinafter), more preferably 10 to 120 parts and, most preferably 20 to 100 parts, per 100 parts of the oxyalkylene polymer (A). When the amount of the plasticizer is smaller than one part, the effects thereof as a plasticizer cannot be fully exerted. When it exceeds 150 parts, on the other hand, the resulting curing composition shows a lowered mechanical strength as well as insufficient drying characteristics of an alkyd coating.

The air curing compound as described above means a compound which cures through a reaction with atmospheric oxygen. Examples thereof include drying oils such as tung oil and linseed oil; various alkyd resins obtained by denaturing said drying oils; acrylic polymers, epoxy resins and silicone resins denatured with said drying oils; diene polymers such as 1,2-polybutadiene, 1,4-polybutadiene and C5 to C8 diene polymers; and materials obtained by denaturing said polymers or copolymers with maleic acid or a boiled oil. Among these materials, tung oil, liquid diene polymers and denatured products thereof are particularly preferred.

Examples of said liquid diene polymers include liquid polymers obtained by polymerizing diene compounds such as butadiene, chloroprene, isoprene or 1,3-pentadiene; those obtained by copolymerizing these diene compounds with compatible monomers such as acrylonitrile or styrene; and materials obtained by denaturing said polymers with maleic acid or a boiled oil. Among these liquid diene polymers, liquid polybutadiene is preferred and liquid 1,2-polybutadiene is more preferred.

One of these air curing compounds or a mixture thereof can be used in the present invention.

The air curing compound is preferably employed in the composition of the present invention in an amount of 0.1 to 20 parts, more preferably 1 to 10 parts, per 100 parts of the oxyalkylene polymer (A). When the content of the air curing compound is smaller than 0.1 part, the aimed improvement in the drying characteristics of an alkyd coating cannot be fully achieved. When it exceeds 20 parts, on the other hand, the resulting curing composition shows deteriorated tensile properties. There are some compounds which can serve both as a polymeric and/or viscous plasticizer and as an air curing compound. Such a compound may be used in a large amount as a plasticizer, though it is preferably used in an amount within the range as an air curing compound defined above.

The composition of the present invention can be prepared by any method without restriction. A particular example of a method for preparing the same comprises simply adding the air curing compound and the polymeric plasticizer or the viscous plasticizer to the oxyalkylene polymer (A). In this case, the selected air curing compound and plasticizer can be homogeneously dispersed or dissolved in the oxyalkylene polymer (A) by appropriately controlling the conditions including heating and stirring. However, it is not required to establish a completely homogeneous and transparent dispersion. Namely, the object of the present invention can be satisfactory achieved by establishing a dispersion, even if cloudy. A dispersion accelerator such as a surfactant can be further used together, if desired.

Another process for preparing the composition of the present invention comprises blending definite amounts of the air curing compound and plasticizer with the oxyalkylene polymer (A) prior to the final use. When the composition of the present invention is to be formulated into, for example, a two-component sealing agent, the oxyalkylene polymer (A) is mixed with the air curing compound and plasticizer immediately before use.

The composition of the present invention can further comprise various additives such as a curing catalyst for the oxyalkylene polymer (A) or a bulking agent. Examples of the curing catalyst include organotin compounds, acidic phosphates, materials obtained by reacting an acidic phosphate and an amine, saturated or unsaturated carboxylic acids and anhydrides thereof and organic titanate compounds.

Examples of said organotin compounds include dibutyltin dilaurate, dioctyltin dimaleate, dibutyltin phthalate, tin octylate and dibutyltin methoxide.

Examples of said acidic phosphates mean phosphates including a

moiety, such as an organic acidic phosphate of the formula

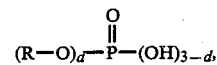

wherein d is 1 or 2 and R represents an optionally substituted hydrocarbon group having 1 to 20 carbon atoms. Examples thereof include the following compounds:

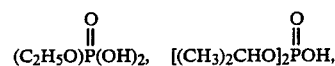

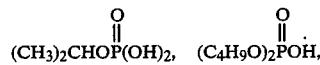

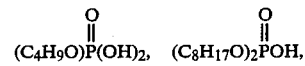

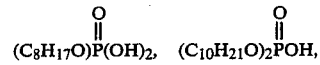

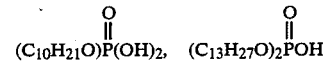

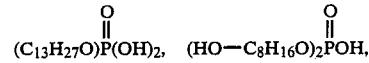

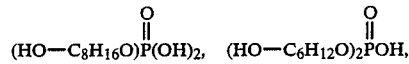

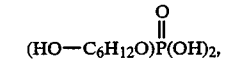

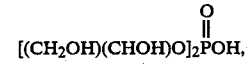

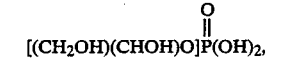

Examples of said organic titanate compounds include titantates such as tetrabutyl titanate, tetraisopropyl titanate and triethanolamine titanate. When a curing catalyst is to be employed, it may be preferably added in an amount of 0.1 to 20 parts per 100 parts of the oxyalkylene polymer (A).

Examples of said bulking agent include heavy calcium carbonate, light calcium carbonate, glue calcium carbonate, kaolin, talc, silica, titanium oxide, aluminum silicate, magnesium oxide, zinc oxide and carbon black.

Examples of said other additives include anti-sagging agents such as hydrogenated castor oil or organic bentonite, colorants and antioxidants.

The composition of the present invention can further comprise, as a matter of course, a low molecular weight and a less viscous plasticizer such as dioctyl phthalate, so long as the objects of the present invention are not inhibited thereby.

The composition of the present invention thus obtained is useful in, for example, adhesives, pressure-sensitive adhesives, coatings, waterproof materials, sealants, templating materials, rubber-molding materials and foamed materials.

For example, a construction sealant may be prepared in the following manner: 10 to 300 parts of an inorganic bulking agent(s) such as calcium carbonate, talc or kaolin are added to 100 parts of the oxyalkylene polymer (A) to be used in the present invention. Further appropriate amounts of pigment(s) such as titanium oxide or carbon black and antioxidant(s) such as UV absorber(s) and radical chain terminator(s) are added thereto, if desired. The mixture thus obtained is thoroughly kneaded homogeneously with a kneader or a paint roll and then applied. It is then exposed to the atmospheric moisture and cured therewith. Thus a rubber-like elastic material excellent in weathering properties, transparency and tensile elongation is obtained.

When employed as a coating, the composition is cured under the same conditions as those described above. Thus it is highly useful as a highly elastic coating for construction uses, a primer for concrete materials and a waterproof material.

An alkyd coating may be applied onto the cured material obtained from the composition of the present invention. In this case, the application can be readily conducted after the composition is almost completely cured. However, the application can be conducted when a cured material is formed on the surface of the composition.

Any alkyd coating may be used without restriction. Examples thereof include those mainly comprising so-called oil-denatured alkyd resins which are obtained by denaturing a condensate obtained from a polybasic acid, such as phthalic anhydride or maleic anhydride, and a polyhydric alcohol, such as glycerol, pentaerythritol, ethylene glycol or trimethylolethane, with a fatty oil or a fatty acid such as linseed oil, soybean oil, castor oil or safflower oil; or denatured alkyd resins obtained by denaturing various resins with, for example, a vinyl monomer. It may be in any form, for example, alkyd resin varnish or enamel for automobile, aircraft or industrial uses; alkyd resin-blended paints (which are also called synthetic resin-blended paints) for coating buildings, bridges or marine structures; and alkyd resin primer coatings for automobiles, machinery, electrical devices and furniture.

The present invention is hereinafter described in greater detail with reference to examples, which are not to be construed as limiting the scope thereof.

Synthesis Example 1

800g of a polyoxypropylene polymer of an average molecular weight of approximately 8000, to approximately 97% of the total terminals of which allyl ether groups were introduced, was introduced into a pressure reactor provided with a stirrer and 19g of methyldimethoxysilane was added thereto. Then 0.34 ml of a solution of platinic chloride catalyst solution, obtained by dissolving 8.9 g of $H_2PtCl_6 \cdot 6H_2O$ in 18 ml of isopropyl alcohol and 160 ml of tetrahydrofuran, was added thereto and the obtained mixture was allowed to react at 80° C. for six hours.

The amount of the silicon hydride remaining in the reaction mixture was determined by IR spectrometry. As a result, scarcely any silicon hydride was detected. Reactive silicon groups were determined by NMR. As a result, it was found that a polyoxypropylene polymer having approximately 1.7 terminal

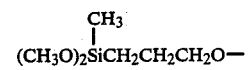

groups per molecule was obtained.

Examples 1 to 7 and Comparative Examples 1 to 8

100 g of the polymer obtained in Synthesis Example 1 was blended with the plasticizer and the air curing compound, each in a definite amount, as shown in Table 1. Then 120 g of calcium carbonate (CCR: manufactured by Shiraishi Kogyo K.K.), 20 g of titanium oxide (R820: manufactured by Ishihara Sangyo K.K.), 0.5 g of styrenated phenol and 2 g of dibutyltin diacetylacetonate were added thereto. The obtained mixture was rolled thrice and then a sheet of 3 mm in thickness was prepared. The obtained sheet was cured at 23° C. under a relative humidity (RH) of 65% for one day. Subsequently, a commercially available alkyd coating (Rubbol AZ: manufactured by Sikkens Co.) was applied thereto with a brush and then allowed to stand at 23° C. under an RH of 65% to thereby examine the drying characteristics of the coating. Table 1 summarizes the results.

In Table 1, the plasticizer A is the polyoxypropylene having allyl ether terminals used in Synthesis Example 1 (viscosity at 25° C.: 35 poise); the plasticizer B is poly-α-methylstyrene (viscosity at 25° C.: 5 poise); the plasticizer C is polypropylene glycol (MW: 000, viscosity at 25° C.: 9 poise); the plasticizer D is an isomeric triaryldiethane mixture (viscosity at 20° C.: 50 poise); DOP means di-2-ethylhexyl phthalate (viscosity at 5° C.: 0.5 poise); BBP means butyl benzyl phthalate (viscosity at 25° C.: 0.5 poise); the liquid 1,2polybutadiene is Nisso Polybutadiene B-100 manufactured by Nippon Soda Co., Ltd.; and the liquid 1,4-polybutadiene is Polyoil 130 manufactured by Nippon Zeon Co.

In Table 1, A means that the applied coating was completely cured and showed no stickiness; B means that the applied coating was cured by somewhat sticky on the surface; C means that the applied coating was insufficiently cured and showed fingermarks; and D means that the applied coating was not cured.

TABLE 1

|  |  | Examples |  |  |  |  |  |  |  | Comparative Examples |  |  |  |  |  |  |  |
|---|---|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 | 7 | 8 |
| Plasticizer | Plasticizer A | 50 | 50 | 50 | — | — | — | 50 | 50 | 50 | — | — | — | — | — | — | — |

TABLE 1-continued

| | | Examples | | | | | | | | Comparative Examples | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| and Air Curing Compound (g) | Plasticizer B | — | — | — | 50 | — | — | — | — | — | 50 | — | — | — | — | — | — |
| | Plasticizer C | — | — | — | — | 50 | — | — | — | — | — | 50 | — | — | — | — | — |
| | Plasticizer D | — | — | — | — | — | 50 | — | — | — | — | — | 50 | — | — | — | — |
| | DOP | — | — | — | — | — | — | — | — | — | — | — | — | 50 | — | 50 | — |
| | BBP | — | — | — | — | — | — | — | — | — | — | — | — | — | 50 | — | 50 |
| | Liquid 1, 2-poly butadiene | 5 | — | — | — | — | — | — | 10 | — | — | — | — | — | — | — | — |
| | Liquid 1, 4-poly butadiene | — | 5 | — | — | — | — | — | — | — | — | — | — | — | — | — | — |
| | Tung oil | — | — | 5 | 5 | 5 | 5 | — | — | — | — | — | — | — | — | 5 | 5 |
| | Linseed oil | — | — | — | — | — | — | 5 | — | — | — | — | — | — | — | — | — |
| Drying Character- istics of alkyd coating* | Rubbol AZ | 1 Day | B | B | B or C | C | C | C | C | B | D | D | D | D | D | D | D | D |
| | | 2 Days | B | B | B | B or C | C | C | C | B | D or C | D | D | D | D | D | D | D |
| | | 3 Days | A | A | B | B | B | B | B | A | C | C | C | C | D | D | D | D |
| | | 7 Days | A | A | A | A | B | B | B | A | C | C | C | C | D | D | C | C |

Remarks:
Drying characteristics: A: Excellent, B: Good, C: Fair and D: Bad

While the invention has been described in detail and with reference to specific embodiments thereof, it will be apparent to one skilled in the art that various changes and modifications can be made therein without departing from the spirit and scope thereof.

What is claimed is:

1. A curing composition having an enhancing effect on the drying characteristics of an alkyd coating, which comprises:
   (A) an oxyalkylene polymer having at least one reactive silicon atom-containing group, said silicon atom-containing group having a hydroxyl group or a hydrolyzable group bound to a silicon atom, and being capable of crosslinking by forming a siloxane bond;
   (B) a plasticizer selected from the group consisting of polymeric plasticizers having a molecular weight in the range of 500-15000 and non-polymeric plasticizers having a viscosity of at least 8 poise at 15° C.; and
   (C) an air curing compound capable of curing said composition by reaction with atmospheric oxygen.

2. A curing composition as set forth in claim 1, wherein said oxyalkylene polymer is an oxyalkylene polymer which has a main chain essentially comprising a repeating unit of the following general formula:

—R'—O— wherein R' represents a substituted or unsubstituted hydrocarbon group having one to eight carbon atoms.

3. A curing composition as set forth in claim 1, wherein said silicon atom-containing group is represented by the following general formula (I):

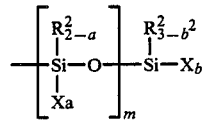

(I)

wherein
R² represents a substituted or unsubstituted monovalent organic group having 1 to 20 carbon atoms, provided that two or more R² groups, if present, can be either the same or different from each other;
X represents a hydroxyl group or a hydrolyzable group, provided that two or more X groups, if present, can be either the same or different from each other;
a is 0, 1 or 2;
b is 0, 1, 2 or 3, provided that (the sum of (a and b) ≧ 1; and
m is 0 or an integer of 1 to 19, provided that

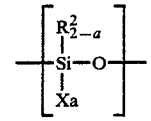

may be either the same or different from each other, when m is 2 or more.

4. A curing composition as set forth in claim 3, wherein X represents a hydrogen atom, a halogen atom, a hydroxyl group, an alkoxy group, an acyloxy group, a ketoxymate group, an amino group, an acid amido group, an aminooxy group, a mercapto group or an alkenyloxy group.

5. A curing composition as set forth in claim 3, wherein X represents an alkoxy group.

6. A curing composition as set forth in claim 1, wherein said polymeric plasticizer is a polyether.

7. A curing composition as set forth in claim 1, wherein said air curing compound is a drying oil.

8. A curing composition as set forth in claim 1, wherein said air curing compound is a liquid polybutadiene.

* * * * *